Figure 1:
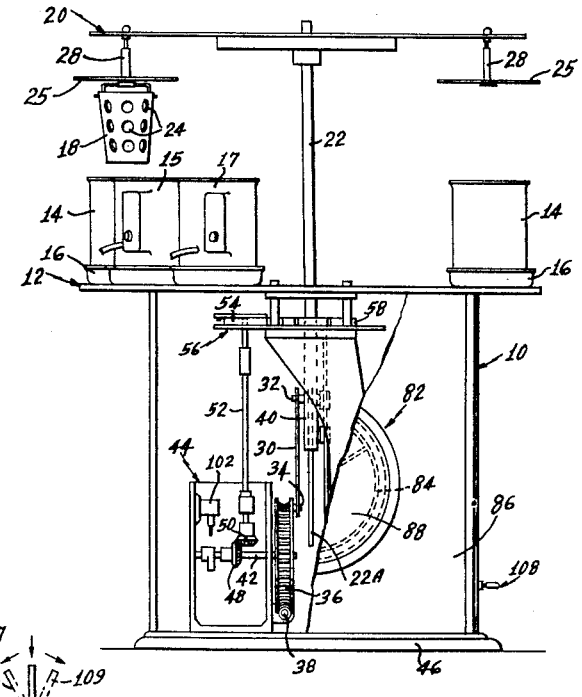

Nov. 22, 1960 M. H. PELAVIN 2,960,962
MANUAL CONTROL FOR AUTOMATIC IMMERSION APPARATUS
Filed March 3, 1958

INVENTOR.
Milton H. Pelavin
BY
ATTORNEYS

United States Patent Office 2,960,962
Patented Nov. 22, 1960

2,960,962

MANUAL CONTROL FOR AUTOMATIC IMMERSION APPARATUS

Milton H. Pelavin, Yonkers, N.Y., assignor to The Technicon Company, Inc., Chauncey, N.Y., a corporation of New York Filed Mar. 3, 1958, Ser. No. 718,685

13 Claims. (Cl. 118—9)

The present invention relates to automatic immersion apparatus, and particularly to automatic immersion apparatus for treating histologic tissue preparatory to microscopic examination thereof.

Although the apparatus embodying the present invention is useful for various purposes, it is intended primarily for use in the preparation of tissue specimens for microscopic examination. In such use, the tissue is immersed in various liquids, including a fixative, a number of dehydrants, liquid paraffin, or other media for predetermined lengths of time and is automatically transferred from one liquid to another liquid at the proper times. This may be preferably accomplished by automatic immersion apparatus operable under the control of a timer as described in United States Patent No. 2,341,198.

In the normal operation of such automatic immersion apparatus, the last immersion of the tissue is in a paraffin bath for the impregnation of the tissue with paraffin, this paraffin bath being positioned next to the receptacle which contains the fixative. This immersion in paraffin occurs at the end of the preset period of operation of the apparatus, during which the several other immersions have already taken place. When it is desired to remove the tissue basket containing the impregnated tissue and to replace the same with a basket containing new tissue for immersion treatment in the apparatus, it is possible, pursuant to the present invention, to manually control the movement of the conveyor whereby the tissue basket can be raised to a position over the paraffin bath so that the melted paraffin can drip from the tissue basket into the paraffin bath therebelow, and so that after the tissue basket containing the impregnated tissue is removed, the conveyor can move laterally, under manual control, one step to position the tissue basket holder over the fixative container, thus enabling the basket of new tissue, which is to be treated during the next period of operation of the machine, to be mounted in the apparatus without the possibility of the liquid fixative carried by the tissue from dripping into the paraffin bath and impairing the paraffin. In this connection, it will be understood that before the tissue is placed in the tissue basket on the immersion apparatus, it is kept in a fixative in order to preserve it until it is subjected to treatment in the immersion apparatus.

Accordingly, one object of the present invention is the provision of manually controlled means for operating the conveyor independently of the timing means, said manual control being capable of interrupting the movement of the conveyor at any point in the raising and lowering movements thereof.

A further object of the present invention is the provision of a conveyor operating means operable under the control of the timing means to provide for the automatic operation of the conveyor to transfer the holder from one receptacle to another, which operating means can also be operated independently of the timing means by manual control which, however, is ineffective to prevent the lowering of the conveyor from a raised position thereof under the control of the timing means, if the manual control operation is performed after the timer is set to control the operations of the conveyor at the predetermined normal transfer times.

In connection with automatic immersion apparatus which is provided with means for deferring the commencement of operation of the apparatus, it is a further object of the invention to provide a manual control means for overriding the time delay means for raising and lowering the conveyor during the time delay interval.

A further object of the invention is to provide for the operation of the conveyor under the normal control of the timing means in the event of a defective relay contact provided for the manual control in the control circuit of the conveyor actuating motor.

The above and other objects, features and advantages of the present invention will be more fully understood from the following description considered in connection with the accompanying illustrative drawings.

Figure 2:
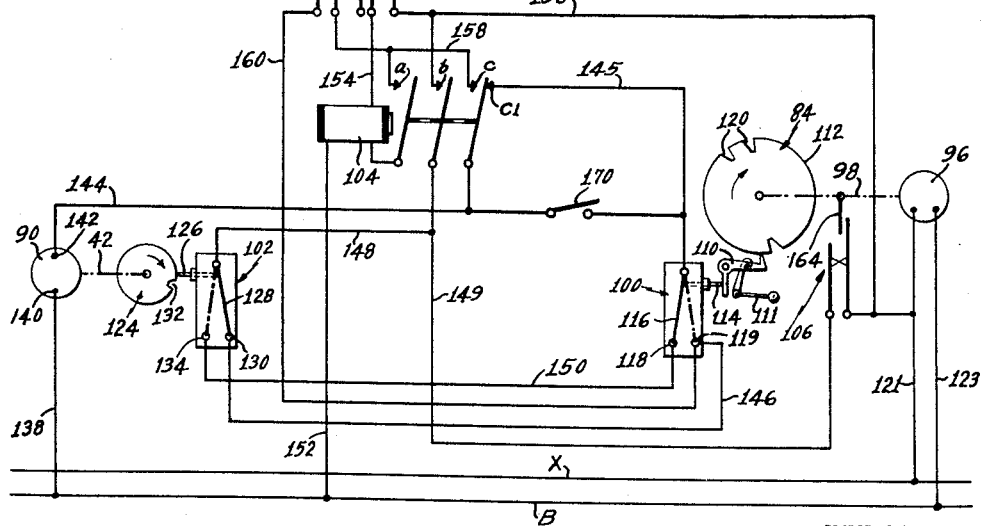

In the drawings:

Fig. 1 is a front elevational view of automatic immersion apparatus embodying the present invention, a portion thereof being broken away for the purposes of illustration, and the conveyor being illustrated in a raised position thereof, several receptacles being omitted for purposes of illustration; and Fig. 2 is a schematic representation of the control circuit illustrating the present invention.

The present invention is illustrated in connection with automatic tissue processing apparatus of the general type illustrated and described in the above and other patents which are owned by the assignee of the present invention. Such apparatus includes a cabinet 10, having a table or support 12 on which there is mounted, in laterally disposed relationship, a plurality of receptacles or beakers 14, only two of which are illustrated in Fig. 1 and one or two, usually two, paraffin baths 15 and 17. The receptacles 14 contain the various liquids for treating histologic tissue specimens in order to prepare the tissue for microscopic examination. Said beakers 14 are removably positioned in the trays 16 which are suitably affixed to the table 12. The tissue specimens are usually placed in small perforated containers (not illustrated) which are disposed in a perforated holder or basket 18 removably carried by a conveyor, generally indicated by the reference numeral 20. The conveyor is mounted by a vertical shaft 22 which imparts lateral and vertical movement to the conveyor, and to the holder 18 carried thereby, for raising the holder out of one receptacle and then moving it laterally step-wise to a position over another receptacle, and then lowering the holder therein for immersing the tissue in the liquid in the receptacle for a predetermined time. While only two receptacles 14 are illustrated herein, it will be understood that the receptacles are arranged in a circle on the support 12, as illustrated in said previously identified patents. The holder or basket 18 is provided with a plurality of apertures 24 to subject the tissue in the holder to the liquid in the receptacles 14. A number of covers 25 may also be carried by the conveyor 20, as by spindles 28 provided on the conveyor, to engage the tops of the receptacles 14 when the holder 18 is in its lowered position, in order to prevent foreign matter from entering the receptacles and to rdeuce evaporation of the liquids therein in the case of the more volatile liquids.

In Fig. 1, the basket 18 is shown in position over a fixative containing receptacle 14 next to the paraffin bath 15. The conveyor 20 rotates clockwise, as viewed from above, and after several operations, its cycle of operations is completed when the holder 18 is positioned in said paraffin bath.

The mechanism for imparting the vertical motion to the shaft 22, as described in Patent No. 2,341,198, includes a connecting rod or lever 30 which is pivotally mounted at one end thereof on a pin 32 secured to a cross-head 40, and which is further pivotally mounted at its other end on a pin 34 which, in turn, is secured to a gear 36. Gear 36 is engaged by a worm gear 38 which is driven by an electric motor 90 (Fig. 2) suitably disposed in cabinet 10. The lower portion 22A of the shaft 22 is slidably and rotatably movable in the cross-head 40. As illustrated in said latter patent, the shaft 22 is provided with a shoulder which is engaged by the upper end of the cross-head 40 during the upward movement of the cross-head by the link 30 for carrying the shaft and the conveyor from the lowermost position thereof, in which the receptacle 18 is immersed in the fluid within a receptacle 14, to the uppermost position thereof illustrated in Fig. 1. On the other hand, when the cross-head 40 is moved downwardly by the link 30, the shaft 22 and the conveyor 20 move downwardly by gravity, without any downward pull on the shaft by the cross-head 40. The gear 36 is mounted on a shaft 42 which is journalled for rotation in the frame 44 suitably mounted on the base 46 of the cabinet 10. The shaft 42 carries a bevel gear 48 which engages a companion bevel gear 50 which is mounted on a shaft 52 operatively connected to the driving member 54 of a Geneva gear mechanism, generally indicated by the reference numeral 56. It will be understood that the rotation of the gear 36 results in the rotation of the bevel gears 48 and 50 for operating the driving member 54 of the Geneva gear mechanism. Said driving member 54 imparts rotary movement to a driven member 58 of the Geneva gear mechanism when the shaft 22 is in its raised position, thereby imparting a rotary movement to the shaft 22 to move the tissue holder 18 laterally from a position over one receptacle to a position over and in registry with the adjacent receptacle. Upon completion of the lateral movement, the shaft 22 is lowered through the operation of the gear 36 and the link 30 in order to immerse the basket 18 into the liquid within the receptacle for subjecting the tissue therein to said liquid.

The apparatus is operated under the control of a timing device generally indicated by the reference numeral 82, having a notched control disk 84, driven by an electric motor 96, through shaft 98 in Fig. 2, and as described in the previously identified patent. Said timing device 82 is positioned within the cabinet 10, and the cabinet is provided with a hinged door 86, having a transparent window 88 through which the timing disk 84 and other parts of the timing device are visible. The circuit of the motor 90, which drives the actuating mechanism, including the gears 38, 36 and the link 30, for operating the shaft 22, and the gears 48, 50 and the shaft 52 for operating the Geneva mechanism 56, is completed and interrupted at the proper times by the timing device 82 substantially in the same way as described in the above mentioned patent.

The timing disk 84 is provided with peripherally spaced notches 120 (Fig. 2) separated by continuous peripheral or circumferential edge portions 112 of the disk. Said disk is engaged by a switch-operating lever 110 in said notches and at its peripheral edge, and conveyor actuating motor 90 is energized under the control of switches 100 and 102, as hereinafter more particularly described, when lever 110 is positioned in any one of said notches. When, as illustrated in Fig. 2, lever 110 is out of a notch, motor 90 is deenergized and the conveyor is at rest. A releasable locking member 111 is operable as described in the above mentioned patent to hold lever 110 releasably in retracted position so that upon completion of the operating cycle of the apparatus under the control of the timer, pursuant to one revolution of disk 84, said lever is prevented from entering a notch and the conveyor cannot be actuated. After the conveyor has been operated under the control of timing disk 84, a predetermined number of times at predetermined intervals, according to the location of the notches cut in said disk, the holder 18 is immersed in the paraffin bath 15. At that time, the operating cycle of the apparatus is completed and locking member 111 is automatically operated to hold lever 110 down so that it cannot enter a notch in said disk.

Referring now to Fig. 2 in detail, there is diagrammatically illustrated the circuit arrangement for controlling the operations of motor 90 under the automatic control of the timing device 82 as well as under manual control. As will be described in detail hereinafter, motor 90 when under automatic control, is controlled primarily by microswitches 100 and 102. Furthermore, as will be described hereinafter in detail, motor 90 may be manually controlled by a relay 104 in combination with a manually operable switch 108. As shown in Fig. 2, the apparatus is illustrated in the condition in which the conveyor 20 is in its lowered position and tissue basket 18 is immersed in one of the liquid receptacles. In this condition, lever 110 engages the outer periphery 112 of timing disk 84. With the lever so disposed on the timing disk, the pin 114 of microswitch 100 is operated to the left, as viewed in Fig. 2, to thereby cause the movable contact member 116 of microswitch 100 to engage contact 118 of microswitch 100. It will be obvious that when the timing disk is moved so that lever 110 is in registry with a notch 120 in timing disk 84, the spring action of the microswitch acts on switch pin 114 to move pivoted lever into said notch and concomitantly moves contact 116 to the right into engagement with contact 119 of said microswitch.

Microswitch 102 is controlled by a cam 124 which is mounted on shaft 42 and rotates therewith. Accordingly, cam 124 makes one revolution during the upward movement, the step lateral or rotational movement, and the downward movement of conveyor 20. Accordingly, pin 126 of microswitch 102 normally engages the outer peripheral edge of cam 124 thereby holding movable contact member 128 of microswitch 102 in its right-hand position as viewed in Fig. 2. However, when pin 126 moves into the notch 132 in cam 124, said pin 126 moves to the left as viewed in Fig. 2 and under the spring action of the switch contact member 128 moves to the left so that it disengages right-hand contact 130 and engages contact 134.

For reasons which will become apparent as the description proceeds, relay 104, which is required for the manual control, is normally deenergized so that contacts $a$, $b$ and $c$ are open and contact $cl$ of relay 104 is closed. Furthermore, it is to be noted that timer motor 96 is directly connected to the power lines B and X by conductors 121 and 123 so that it operates continuously throughout the entire period of treatment of the tissue.

Under automatic operation, when lever 110 moves into a notch 120 in timing disk 84, member 116 of microswitch 100 moves to the right to disengage contact 118 and to engage contact 119, whereby an energizing circuit for motor 90 is established. This circuit may be traced from one power line B, through lead 138 to terminal 140 of motor 90, and from terminal 142 by conductor 144 to contact cl of relay 104, through conductor 145, over movable contact member 116 of microswitch 100 to terminal contact 119 thereof, through conductor 146 to contact 130 of microswitch 102, over movable contact member 128 of microswitch 102 and through conductors 148 and 149 and the contacts of switch 106 to power line X. The function of switch 106 in the control circuit of Fig. 2 will be explained hereinafter. Accordingly, motor 90 is energized and causes conveyor 20 to move upwardly, to rotate so as to move tissue holder 18 from position over one receptacle to a position over an adjacent receptacle and then to move downwardly to the lowered position. During this time, cam 124 turns through substantially one revolution in a clockwise direction as viewed in Fig. 2, until pin 126 of microswitch 102 moves into notch 132 in the cam. When pin 126 moves into notch 132 in cam 124 the above traced circuit becomes open at contact 128—130 of microswitch 102 since movable contact member 128 is moved out of engagement with contact 130 and moved into engagement with contact 134. Accordingly, motor 90 becomes deenergized and the conveyor is at rest. Subsequently, timing disk 84 rotates sufficiently to move lever 110 out of notch 120 and back onto the periphery of disk 84. Accordingly, movable contact 116 moves back into engagement with contact 118 of microswitch 100 and thereby closes a second energizing circuit for motor 90 which energizing circuit may be traced as follows: from power line B, through conductor 138 to terminal 140 of motor 90, out of terminal 142 of motor 90, through conductor 144, over contact cl of relay 104, through conductor 145, through movable contact member 116 of microswitch 100, through contact 118, over conductor 150, through contact 134 of microswitch 102 to movable contact 128 and over conductors 148 and 149, through switch 106 to power line X of the power source. Accordingly, motor 90 becomes reenergized and moves conveyor 20 a second time. However, the second movement is a very short movement and lasts only until cam 124 rotates sufficiently to move pin 126 of microswitch 102 out of notch 132 at which time, movable contact member 128 of microswitch 102 moves out of engagement with contact 134 and back into engagement with contact 130. Accordingly, the motor becomes deenergized a second time and the tissue basket remains immersed in its receptacle 14 for treatment of the tissue within the basket until a predetermined period of time elapses at which time lever 110 engages another notch 120 on timing disk 84 to restart the above described cycle of movement.

In the normal, time-controlled operation of the apparatus the tissue holder, at the end of the processing cycle, is positioned in paraffin bath 15. Heretofore, if a basket of new tissue was mounted on the conveyor when the conveyor is in a raised position with the holder over the paraffin bath the fixative with which the tissue was previously treated, while awaiting processing, might drip into the paraffin bath causing it to become contaminated. In accordance with the present invention, in order to avoid the danger of contamination, provision is made to effect a manual control of motor 90 independently of timing device 82 so as to raise and lower the conveyor 20 during the time that switch control lever 110 engages the peripheral portion 112 of timing disk 84, or is held in retracted position by locking lever 111. The manual control means includes a provision for interrupting the movement of the conveyor in any raised position thereof. Accordingly, the pathologist or his technician may move the tissue holder to a loading position over the fixative receptacle next to the paraffin bath prior to loading the new tissue therein. Manifestly, the manual control means also provides for raising the holder to a position over the receptacle from which it was withdrawn without movement of the conveyor to a position over the next or following receptacle until it is desired to do so.

The manual control circuit is controlled by the operation of lever switch 108. Switch 108 preferably comprises a pivoted actuating lever having a center or neutral position to which it is spring-biased, a pair of normally open contacts, d and e, and a pair of normally closed contacts f and g. When the lever of switch 108 is moved to the left as indicated by dotted lines 107, the normally open contacts d and e are closed, while if the lever is moved to the right, as indicated by dotted line 109, the normally closed contacts f and g are opened. In each case when the lever is released switch 108 returns to its center neutral position.

Assuming the conveyor is in its lowered position in which the tissue basket 18 is immersed in a liquid contained in a receptacle and further assuming that the pathologist or the technician wishes to gain access to the basket or the tissue specimens therein, initiation of the operation of motor 90 under manual control means to be described hereinafter is achieved by moving lever switch 108 to the left as viewed in Fig. 2 so as to close the normally open contacts d and e. When this occurs, relay 104 becomes energized, closing the contacts a, b and c and opening contact cl. The circuit energizing relay 104 may be traced as follows: from power line B, over conductor 152 to the winding of relay 104, from the winding of relay 104 through conductor 154 contacts d and e of switch 108, over conductor 156, and 121 to power line X. A holding circuit is established when relay 104 is energized for maintaining relay 104 in the energized condition. This holding circuit may be traced from power line B over conductor 152 to the energizing coil of relay 104. From the energizing coil of relay 104 through the contact a, through normally closed contacts f and g of switch 108, over conductor 160 to contact 119 of switch 100, through conductor 146 to terminal 130 of switch 102. From switch 102 the holding circuit continues through conductor 148, through contact b, of relay 104, over conductor 156, through conductor 121 to power line X. The provision of this holding circuit enables switch 108 to be released almost immediately after its operation without affecting the energization of relay 104.

Upon operation of relay 104 to close contacts a, b and c, an auxiliary energizing circuit for motor 90 is established. This auxiliary energizing circuit may be traced from power line B, through conductor 138 to terminal 140 of motor 90, from motor terminal 142 through conductor 144, over contact c of relay 104, through conductor 158, contacts f and g of switch 108, over conductor 160 to contact 119, through conductor 146, contacts 128—130 of switch 102, over conductor 148, through contact b of relay 104, over conductors 156 and 121 to power line X. Accordingly, motor 90 is thus energized and starts moving conveyor 20 upward. In the absence of any other action by the attendant the auxiliary energizing circuit is effective to move the tissue basket from a position over one receptacle to a position over a second receptacle at which time the motor causes the conveyor to be lowered to its lowered position. As the conveyor reaches its lowered position, pin 126 moves into notch 132 of cam 124 and, accordingly, opens contact 128—130 and closes contact 128—134. With contact 128—130 open the previously traced holding circuit for relay 104 is interrupted thereby deenergizing relay 104 causing that relay to release. With relay 104 deenergized, the previously traced auxiliary energizing circuit for motor 90 becomes open at contact c of relay 104 as well as at contact 130—128 of microswitch 102. With relay 104 deenergized the conveyor is once again placed under the control of the timing means 82 and pin 126 is moved out of notch 132 in cam 124 in the manner heretofore described to prepare the conveyor for the next time controlled movement which can follow in the normal manner.

It will be noted that the energizing and holding circuits for relay 104 and the manually activated auxiliary energizing circuit for motor 90 do not include the contacts of switch 106. Switch 106 represents switch means provided in the control circuit of the apparatus for deferring the operation of the apparatus under the control of the timing means 82 for a predetermined interval of time. A detailed description of a delay means is described in U.S. Patent No. 2,894,482. In accordance with said patent there is provided herein a switch 106 for controlling the application of electrical power to the conveyor actuating means. As seen in Fig. 2, switch 106 is in series with the power line X and controls the application of electrical power to switches 100 and 102. As represented diagrammatically in Fig. 2, switch 106 is operatively connected to timing motor 96 through a lever 164 as at 98. During the time delay interval lever 164 engages switch 106 to open the contacts thereof. This action prevents electrical power from power line X from passing to switches 100 and 102. At the conclusion of the time delay interval lever 164 is disengaged from switch 106 causing the contacts thereof to close, as seen in Fig. 2, thereby making available to switches 100 and 102 electrical power from power line X. Pursuant to the present invention, there is provided means for bypassing the contacts of switch 106 to actuate the conveyor during the time delay interval. In this connection, as seen in Fig. 2 the previously described energizing and holding circuits for relay 104 and the auxiliary energizing circuit for motor 90 are connected through relay contact b, and conductors 156 and 121 to power line X, and do not include switch 106. Switch 106 is by-passed, by the manual control circuit, making it possible to manually operate the conveyor independently of the time control means, and switch 106 in particular.

Assuming that after the operation of the conveyor is initiated under manual control, it is desired to terminate the movement of the conveyor at some point, over the fixative receptacle for example for loading, lever switch 108 is moved to the right as indicated by dotted lines 109, thereby causing contacts f and g of switch 108 to open. The previously traced energizing circuit, and holding circuit is thereby interrupted and relay 104 is deenergized. The contacts a, b and c of elay 104 are opened and the contact cl is closed, reestablishing the control of the conveyor actuating means by the time control means 82. However, since the lever 110 is on the rim of disk 84 the energizing control for motor 90 is not established thereby and the conveyor remains in the raised position. To lower the conveyor to the following receptacle, lever switch 108 is moved to the left to close switch contacts d and e to reenergize relay 104 and to complete the energizing circuit for motor 90. When the tissue holder is positioned in the receptacle, cam 124, in the manner heretofore described is rotated to a position whereby the lever 126 of switch 102 is positioned in notch 132. Movable contact 128 of switch 102 is thereby positioned in contact with fixed contact 134 of switch 102 breaking the energizing circuit of motor 90 and terminating its movement. Relay 104 is deenergized by the movement of movable contact 128 to fixed contact 134 reestablishing the control of the conveyor actuating means by time control means 82.

Assuming now that the pathologist or his technician has raised the conveyor to a raised position through the operation of lever switch 108 and has neglected or forgotten to return the conveyor to its lowered position, as previously discussed, the conveyor while in a stationary raised position is under the control of the time control means 82. Now, in this condition, let it be further assumed that timing disk 84 has revolved sufficiently to cause lever 110 to move into one of the notches 120 therein. Accordingly, movable contact 116 of microswitch 100 moves out of engagement with contact 118 and into engagement with contact 119. Accordingly, an energizing circuit is established for motor 90 which circuit may be traced from power line B, through conductor 138 to terminal 140 of motor 90, out of terminal 142 of motor 90, through conductor 144, over contact cl of relay 104, through conductor 145, through contacts 116—119 of microswitch 100, through conductor 146, through contact 128—130 of microswitch 102, and through conductors 148 and 149, switch 106 and conductor 121 to power line X of the power source. Accordingly, motor 90 is reenergized and moves the conveyor from the raised position into the adjacent receptacle 14 at which time pin 126 of microswitch 102 moves into notch 132 in cam 124 to open contact 128—130 and thereby open the last mentioned energizing circuit for motor 90. Accordingly, it will be seen that the automatic control means for motor 90 overrides the manual control means therefor and reestablishes the automatic control so that the machine may function normally in the automatic manner.

Pursuant to still another object of this invention there is provided a manually operable means to enable the user to operate the apparatus under the control of the timing means 82 in the event that the contact cl of relay 104 is defective or fails to make proper electrical contact. The manually operable means comprises a switch 170 which is connected to conductors 144 and 145 to parallel the contact cl. Switch 170 is normally open but in a closed condition its shorts across contact cl enabling the timing means 82 to function in its normal manner.

The subject matter of this invention is related to my United States application, Ser. No. 506,862, filed May 9, 1955, now U.S. Patent No. 2,869,508.

While I have shown and described the preferred embodiment of my invention, it will be understood that various changes may be made in the idea or principles of the invention within the scope of the appended claims.

Having thus described my invention, what I claim and desire to secure by Letters Patent is:

1. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; manually controlled means operable independently of said timing means for controlling the operation of said motor independently of said timing means, said manually controlled means including means operable by momentary manual operation to initiate the operation of said motor to actuate said conveyor mechanism, said manually controlled means including a holding circuit for maintaining the motor energized following said momentary manual operation of said manually operable means, said manually controlled means also including means operable by momentary manual operation to supersede said holding circuit to deenergize said motor when the conveyor is in a position to support the holder above one of the receptacles.

2. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; manually controlled means operable independently of said timing means for controlling the operation of said motor independently of said timing means, said manually controlled means including means operable by momentary manual operation to initiate the operation of said motor to actuate said conveyor mechanism, said manually controlled means including a holding circuit for maintaining the motor energized following said momentary manual operation of said manually operable means, said manually controlled means also including means operable by momentary manual operation to supersede said holding circuit to deenergize said motor when the conveyor is in a position to support the holder above one of the receptacles, and means rendering said manually controlled means ineffective to prevent the actuation of said conveyor by said timing means to lower said conveyor from said position.

3. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; manually controlled means operable independently of said timing means for controlling the operation of said motor independently of said timing means, said manually controlled means including means operable by momentary manual operation to initiate the operation of said motor to actuate said conveyor mechanism, said manually controlled means including a holding circuit for maintaining the motor energized following said momentary manual operation of said manually operable means, said holding circuit comprising relay means operable during the manually controlled movement of the conveyor, said manually controlled means also including manually operable switch means in the energizing circuit of the relay for interrupting said energizing circuit for deenergizing the relay for terminating the movement of the conveyor at any point in the movement thereof by said manually controlled means.

4. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; time delay means for deferring the operation of the conveyor under control of the timing means for a predetermined time interval, and manually controlled means operable independently of said timing means for controlling the operation of said motor independently of said timing means, said manually controlled means including means operable by momentary manual operation to initiate the operation of said motor to actuate said conveyor mechanism, said manually controlled means including means for by-passing said time delay means for operating said motor during the predetermined time delay interval.

5. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; time delay means for deferring the operation of the conveyor under control of the timing means for a predetermined time interval, and manually controlled means operable independently of said timing means for controlling the operation of said motor independently of said timing means, said manually controlled means including means operable by momentary manual operation to initiate the operation of said motor to actuate said conveyor mechanism, said manually controlled means including means for by-passing said time delay means for operating said motor during the predetermined time delay interval, said time delay means comprising switch means controlling the provision of electrical power to said motor and said by-pass means comprising a relay adapted to be energized independently of the time delay means and having contact means thereon operable to by-pass said switch means.

6. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; time delay means for deferring the operation of the conveyor under control of the timing means for a predetermined time interval, said time delay means comprising switch means controlling the provision of electrical power to said motor, and manually controlled means operable independently of said timing means for controlling the operation of said motor independently of said timing means, said manually controlled means including means operable by momentary manual operation to initiate the operation of said motor to actuate said conveyor mechanism, said manually controlled means including a holding circuit adaptable for being activated independently of said time delay means for by-passing said time delay means and for maintaining the motor energized following said momentary manual operation of said manually operable means until said holder is positioned in a receptacle.

7. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; time delay means for deferring the operation of the conveyor under control of the timing means for a predetermined time interval, said time delay means comprising switch means controlling the provision of electrical power to said motor, and manually controlled means operable independently of said timing means for controlling the operation of said motor independently of said timing means, said manually controlled means including means operable by momentary manual operation to initiate the operation of said motor to actuate said conveyor mechanism, said manually controlled means including a holding circuit adaptable for being activated independently of said time delay means for by-passing said time delay means and for maintaining the motor energized following said momentary manual operation of said manually operable means until said holder is positioned in a receptacle, said manually controlled means also including means operable by momentary manual operation to supersede said holding circuit to deenergize said motor.

8. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; time delay means for deferring the operation of the conveyor under control of the timing means for a predetermined time interval, said time delay means comprising switch means controlling the provision of electrical power to said motor, and manually controlled means operable independently of said timing means for controlling the operation of said motor independently of said timing means, said manually controlled means including means operable by momentary manual operation to initiate the operation of said motor to actuate said conveyor mechanism, said manually controlled means including a holding circuit adaptable for being activated independently of said time delay means, said holding circuit comprising a relay having first contact means connected in parallel with said switch means to by-pass said switch means for actuating said motor during the time delay interval, second and third contact means in the energizing circuits of said relay and motor respectively for maintaining the relay and motor energized following said momentary manual operation and until said relay is deenergized.

9. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; time delay means for deferring the operation of the conveyor under control of the timing means for a predetermined time interval, said time delay means comprising switch means controlling the provision of electric power to said motor, and manually controlled means operable independently of said timing means for controlling the operation of said motor independently of said timing means, said manually controlled means including means operable by momentary manual operation to initiate the operation of said motor to actuate said conveyor mechanism, said manually controlled means including a holding circuit adaptable for being activated independently of said time delay means, said holding circuit comprising a relay having first contact means connected in parallel with said switch means to by-pass said switch means for actuating said motor during the time delay interval, second and third contact means in the energizing circuits of said relay and motor respectively for maintaining the relay and motor energized following said momentary manual operation and until said relay is deenergized, said manually controlled means also including normally closed manually operable switch means in the energizing circuit of said relay for deenergizing said relay at any raised position of the holder.

10. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; manually controlled means operable independently of said timing means for controlling the operation of said motor independently of said timing means, said manually controlled means including means operable by momentary manual operation to initiate the operation of said motor to actuate said conveyor mechanism, said manually controlled means including a relay having contact means for interrupting the control of the motor by said timing means during said manual control, and means for by-passing said contact means, whereby said control by said timing means may be reestablished independently of said contact means.

11. In automatic immersion apparatus, comprising a conveyor for moving a material holder into and out of a plurality of receptacles disposed laterally of each other, mechanism for actuating said conveyor and for moving it to raise and lower the holder and to move it laterally of the receptacles while in a raised position, means including an electric motor for operating said mechanism, and timing means for controlling the operations of said motor for transferring the holder from one receptacle to another with a predetermined dwell period of the holder in each receptacle; manually controlled means operable independently of said timing means for controlling the operation of said motor independently of said timing means, said manually controlled means including means operable by momentary manual operation to initiate the operation of said motor to actuate said conveyor mechanism, said manually controlled means including a relay having contact means for interrupting the control of the motor by said timing means during said manual control, and means for by-passing said contact means, whereby said control by said timing means may be reestablished independently of said contact means, said by-passing means comprising a manually operable switch, said switch being normally in an open condition and adapted, when closed, to short said contact means.

12. In automatic immersion apparatus, comprising a conveyor movable up and down and laterally for transferring a material holder from one to another of laterally arranged receptacles, means for actuating said conveyor, time-control means, and electrical means operable under the control of said time-control means for operating said actuating means to operate said conveyor for transferring said holder from one receptacle to another receptacle at predetermined times; manually operable auxiliary time-free control means for controlling the operation of said means for operating said conveyor actuating means independently of said time-control means for raising and lowering said conveyor and for moving the latter laterally for transferring said holder from one receptacle to another, said manual control means including means for automatically terminating the movement of said conveyor in the lowered position thereof following said raising lateral and lowering movements of the transfer operation, said manual control means also including means for stopping movement of said conveyor in any position thereof.

13. In automatic immersion apparatus, comprising a conveyor for moving a material holder into and out of a plurality of receptacles disposed laterally of each other, mechanism for actuating said conveyor to raise and lower said holder and to move said holder laterally of the receptacles while in a raised position to complete a cycle of movement for said conveyor, means including an electric motor for operating said mechanism, and timing means for controlling the operations of said motor for transferring the holder from one receptacle to another with a predetermined dwell period of the holder in each receptacle; manually controlled means operable independently of said timing means for controlling the operation of said motor independently of said timing means, comprising means operable by momentary manual operation to initiate the operation of said motor to actuate said conveyor for movement through said one cycle of operation, means operable by momentary manual operation for interrupting said conveyor movement at any one position in said cycle, and means for automatically restarting movement of said conveyor after said conveyor movement has been interrupted by said interrupting means.

References Cited in the file of this patent

UNITED STATES PATENTS

| | | |
|---|---|---|
| 2,157,875 | Weiskopf | May 9, 1939 |
| 2,341,198 | Weiskopf | Feb. 4, 1944 |
| 2,386,079 | Weiskopf | Oct. 2, 1945 |
| 2,437,109 | Maquat | Mar. 2, 1948 |
| 2,442,183 | Stearns | May 25, 1948 |
| 2,508,200 | Tarlton | May 16, 1950 |
| 2,572,785 | Vaughn | Oct. 23, 1951 |
| 2,583,379 | Kling | Jan. 22, 1952 |
| 2,591,124 | Boyan | Apr. 1, 1952 |
| 2,686,895 | Feldhausen | Aug. 17, 1954 |
| 2,804,840 | Dolan | Sept. 3, 1957 |